G. P. GANSTER.

Shell-Fuse.

No. 42,363. Patented Apr. 19, 1864.

Witnesses:
Clinton Rice
George W. Darby

Inventor:
George P. Ganster

UNITED STATES PATENT OFFICE.

GEORGE P. GANSTER, OF NEW YORK, N. Y.

IMPROVEMENT IN HAND-GRENADES.

Specification forming part of Letters Patent No. 42,363, dated April 19, 1864.

*To all whom it may concern:*

Be it known that I, GEORGE P. GANSTER, of the city, county, and State of New York, have invented a new Safety Hand-Grenade; and I do hereby declare that the following is a full and exact description thereof, reference being had to the accompanying drawings and to the letters of reference marked thereon.

The nature of my invention consists in so constructing a hand-grenade that it is self-discharging, and its discharge is made to depend upon the will of the operator, and it may be transported from place to place or may be dropped or suffer concussion without danger of premature explosion.

To enable others to manufacture and use my invention, I will proceed to describe its construction and operation.

Figure 1:
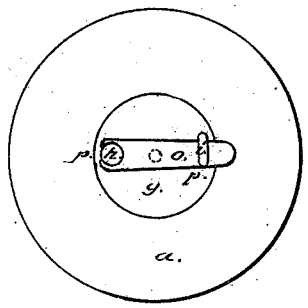
Figure 3:
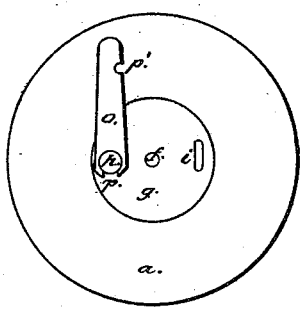
Figure 5:
Figure 2:
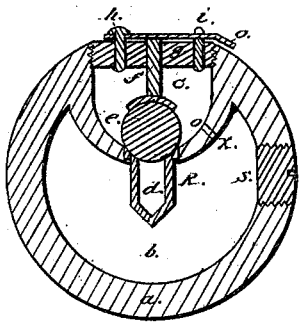
Figure 4:
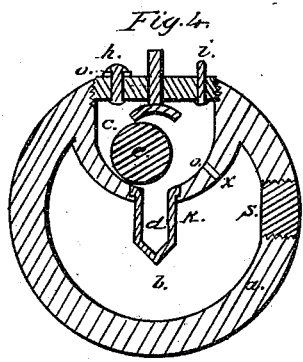

I construct any shell-grenade or case-shot with a fuse-chamber of any proper size, as shown by letter $c$ in Figs. 2 and 4 in the accompanying drawings, by casting the same therein of the same metal as the shell or grenade, or by "setting in" the same of any other proper metal by means of a screw. An extra chamber or vial of lead or other suitable material is placed in the bottom of the first chamber, of similar shape and relative size, as shown by letter $d$ in Figs. 2 and 4. A prime-hole, $x$, is made in the fuse-chamber $c$, leading into the powder-chamber $b$. In fuse-chamber $c$, I place a stopper or weight, $e$, made of lead or other suitable material, of the relative size, as shown in Figs. 2 and 4. The mouth of chamber $c$ is closed by a screw-plug, $g$. This screw-plug has a hole through its center to receive the pin $f$, which has a concave head, so made as to fit down closely over the stopper or weight $e$, in manner as shown. The screw-plug $g$ is fitted with a pin or headed rivet, $h$, as shown in the drawings, and with a catch, $i$, as shown in Fig. 5. The pin or rivet $h$ has its head formed a small space above the plane surface of the screw-plug $g$, to admit of the thickness of the slotted flat safety-lever $o$, which last, when inserted under the said pin $h$, is pressed down upon the pin $f$, (which is made to pass up just above the plane-surface of the screw-plug $g$,) and which is thus forced upon the stopper or weight $e$, by which the said stopper is itself pressed immovably down upon and effectually closing air-tight the mouth of the vial $d$. The safety-lever $o$, when thus pressed down, is securely sprung under the catch $i$, and there remains fastened, as shown in Figs. 1 and 2. I fill the vial $d$ with sulphuric acid, about two-thirds full. I then place the stopper or weight $e$ (which I have previously coated with bees or other wax or plastic substance which will withstand the effects of sulphuric acid) on the mouth of the vial, and pressing it down with force tightly close the same. The prime-hole $x$, I fill with wax. Then I put a small pistol-charge of a powder composed of two (2) ounces of chloride of potassa, one (1) ounce of sulphur, one-fourth ($\frac{1}{4}$) of an ounce of gum-arabic, and one-fourth ($\frac{1}{4}$) of an ounce of powdered sugar, (or of any other powder or composition that will ignite in contact with sulphuric acid,) carefully amalgamated into the fuse-chamber $c$. Then placing the concave head of the pin $f$ upon the stopper or weight $e$, I insert the other end into its place in the screw-plug $g$, and then screw the latter down to its bearing. I then place the lever $o$ in its proper position under the head of the rivet or pin $h$, as shown in Fig. 3, and afterward spring it around over the pin $f$ and into the catch $i$, as before described. The shell or grenade is then charged with powder through the screw-plug $s$, as shown in Figs. 2 and 4.

When the shell or grenade is to be exploded, the operator presses the safety-lever $o$ from under the catch $i$, but holding it down with his thumb; and when the grenade is thrown the safety-lever flies off as it leaves his hand, and the grenade on striking any object displaces the stopper or weight $e$, permitting the sulphuric acid and the powder contained within the fuse-chamber $c$ to come in contact, which at once causes ignition, by which the waxen plug of the prime-hole $x$ is forced out and explosion of the projectile ensues.

What I claim as my invention, and desire to secure by Letters Patent, is—

The peculiar construction and arrangement of the compound chambers $c$ $d$, in combination with the ball $e$, for separating the chambers $c$ and $d$ and their respective chemical contents, together with the detent $f$ and its mechanical arrangements, substantially as described, and for the purposes set forth.

GEORGE P. GANSTER.

Witnesses:
CLINTON RICE,
GEORGE W. DARBEY.